United States Patent
Juretzek

(10) Patent No.: US 8,981,583 B2
(45) Date of Patent: Mar. 17, 2015

(54) METHOD FOR STABILIZATION OF THE NETWORK FREQUENCY OF AN ELECTRICAL POWER NETWORK

(75) Inventor: Uwe Juretzek, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 943 days.

(21) Appl. No.: 13/139,734

(22) PCT Filed: Dec. 2, 2009

(86) PCT No.: PCT/EP2009/066234
§ 371 (c)(1),
(2), (4) Date: Sep. 2, 2011

(87) PCT Pub. No.: WO2010/072524
PCT Pub. Date: Jul. 1, 2010

(65) Prior Publication Data
US 2011/0304159 A1 Dec. 15, 2011

(30) Foreign Application Priority Data
Dec. 16, 2008 (DE) .......................... 10 2008 062 588

(51) Int. Cl.
| | | |
|---|---|---|
| *H02P 9/04* | (2006.01) | |
| *F02C 6/18* | (2006.01) | |
| *F01K 23/10* | (2006.01) | |
| *F02C 1/00* | (2006.01) | |

(Continued)

(52) U.S. Cl.
CPC . *F02C 6/18* (2013.01); *F01K 23/10* (2013.01); *F02C 1/007* (2013.01); *F02C 3/10* (2013.01); *F02C 9/16* (2013.01); *H02P 9/04* (2013.01); *F05D 2270/061* (2013.01); *F05D 2270/00* (2013.01)
USPC ..................................... 290/40 B; 60/39.182

(58) Field of Classification Search
CPC ........ H02P 9/04; F02D 29/06; F02D 2250/24
USPC ..................................... 60/39.182; 290/40 B
See application file for complete search history.

(56) References Cited

U.S. PATENT DOCUMENTS

| | | | |
|---|---|---|---|
| 3,255,585 A | 6/1966 | Grieb | |
| 4,184,083 A | 1/1980 | Takeuchi | |
| RE30,589 E * | 4/1981 | Park | ................................ 60/652 |

(Continued)

FOREIGN PATENT DOCUMENTS

| | | |
|---|---|---|
| CN | 101153546 A1 | 4/2008 |
| DE | 3422210 A1 | 12/1984 |

(Continued)

*Primary Examiner* — Pedro J Cuevas
*Assistant Examiner* — Sean Gugger

(57) ABSTRACT

A method for stabilizing the network frequency of an electrical power network is provided. The network includes at least a two-shaft gas turbine which includes power turbine and a gas generator, wherein the power turbine is connected to a first generator by means of a shaft in a torque transferring manner. Also, an assembly for carrying out the method is provided. The first shaft of the power turbine and the first generator turn permanently synchronized with the power network and the first generator drives the rotation as a motor and a second shaft of the gas generator permanently turns at an ignition speed, wherein the gas generator is ignited upon a power demand and the power turbine is driven by the created hot gas of the gas generator, such that the first generator creates power.

20 Claims, 1 Drawing Sheet

(51) Int. Cl.
*F02C 3/10* (2006.01)
*F02C 9/16* (2006.01)

(56) References Cited

U.S. PATENT DOCUMENTS

| | | | | |
|---|---|---|---|---|
| 4,421,989 A | * | 12/1983 | Brannstrom | 290/40 R |
| 4,424,668 A | * | 1/1984 | Mukherjee | 60/39.182 |
| 4,482,814 A | * | 11/1984 | Daniels | 290/40 B |
| 4,529,887 A | | 7/1985 | Johnson | |
| 6,313,544 B1 | * | 11/2001 | Mongia et al. | 290/52 |
| 6,338,241 B1 | * | 1/2002 | Shibuya et al. | 60/39.182 |
| 6,608,395 B1 | * | 8/2003 | Steinway | 290/40 C |
| 2006/0225431 A1 | | 10/2006 | Kupratis | |
| 2007/0089425 A1 | | 4/2007 | Fossum | |
| 2008/0148881 A1 | * | 6/2008 | Moniz et al. | 74/15.6 |

FOREIGN PATENT DOCUMENTS

| | | |
|---|---|---|
| EP | 0432753 A1 | 6/1991 |
| GB | 932718 A | 7/1963 |
| JP | 57159933 A | 10/1982 |
| RU | 2121746 C1 | 11/1998 |
| RU | 2312229 C2 | 12/2007 |
| WO | WO 8702755 A1 | 5/1987 |

* cited by examiner

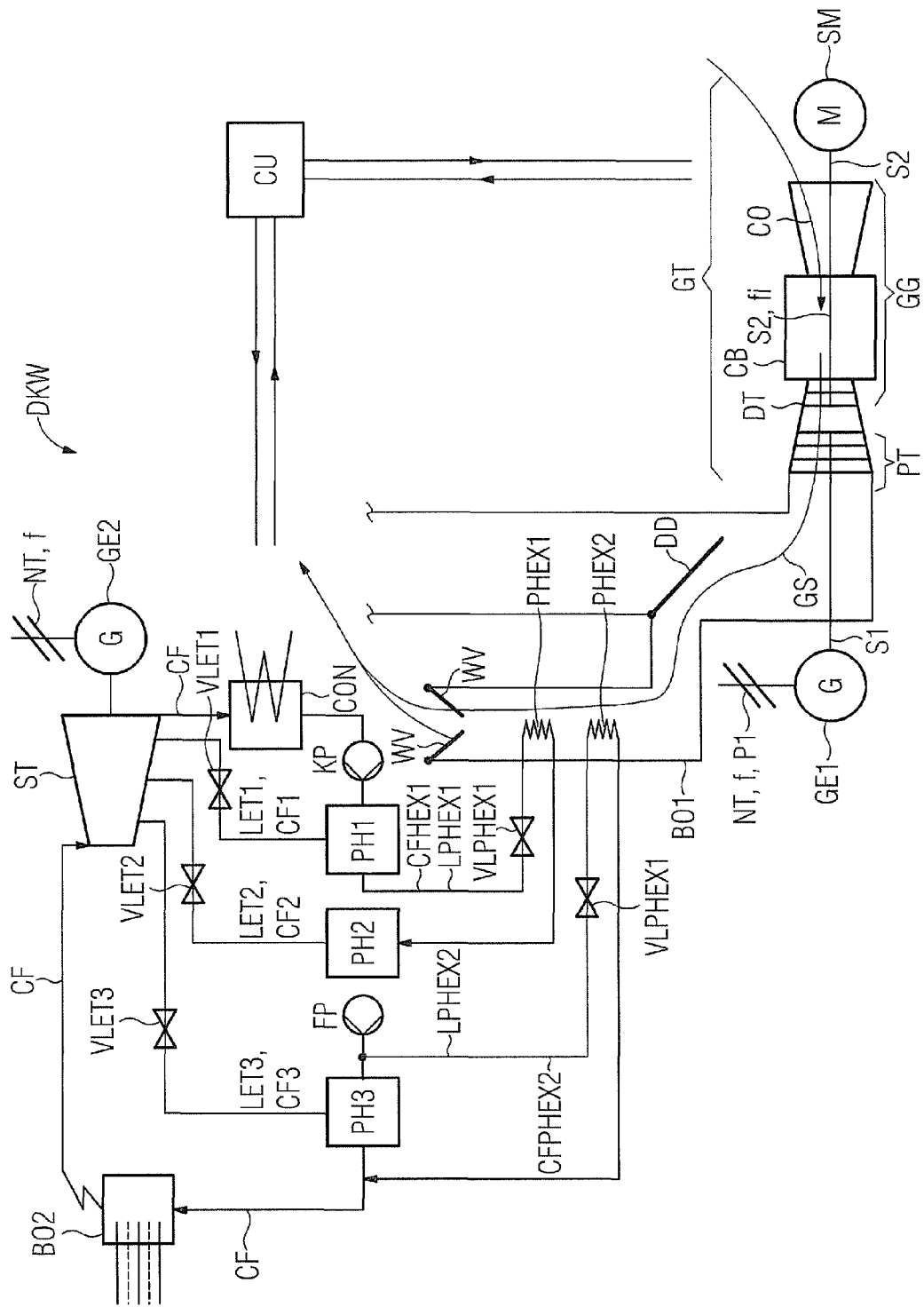

METHOD FOR STABILIZATION OF THE NETWORK FREQUENCY OF AN ELECTRICAL POWER NETWORK

CROSS REFERENCE TO RELATED APPLICATIONS

This application is the US National Stage of International Application No. PCT/EP2009/066234, filed Dec. 2, 2009 and claims the benefit thereof. The International Application claims the benefits of German application No. 10 2008 062 588.4 DE filed Dec. 16, 2008. All of the applications are incorporated by reference herein in their entirety.

FIELD OF INVENTION

The invention relates to a method for stabilization of the grid system frequency of an electrical grid system, in which a gas turbine which has at least two shafts has a power turbine and a gas generator, wherein the power turbine is connected by means of a first shaft to a first generator in a torque-transmitting manner. The subject matter of the invention also covers an arrangement for carrying out the method.

BACKGROUND OF INVENTION

In order to support the frequency within a grid system, all power station operators have to maintain a specific power reserve which can be called up within a predetermined time, and there is a fundamental distinction in this case between primary control and secondary control. The additional power output is used to return a frequency to the nominal value again, when said frequency is below the nominal value because of the power demand that has not been covered (electricity demand in the grid system is greater than that available).

In this case, the requirements vary from one grid system to another. In accordance with the UCTE (Union for the coordination of transmission of electricity) rules, for example, 2% additional power output is required within 30 seconds (primary control, in general this is referred to as primary control in the range from 10 to 30 seconds, or in general as frequency control in the seconds range). This power reserve is in this case provided by various measures within the energy generator installations which are already connected to the grid system, and these measures lead to a deterioration in the performance of the energy generator installations, and to increased technical complexity, which results in costs.

Furthermore, rules also exist which are determined on the grid system for providing additional power in the range from more than 30 seconds to 30 minutes (secondary control, or in general frequency control in the minutes range) which can be provided, in addition to the installations which are already connected to the grid system by, for example, peak-load installations, which are kept at readiness, as well.

In the case of steam power stations (DKW), the reserves are maintained in the seconds range by the present-day prior art by, inter alia, throttling back the turbine valves, that is to say by storage of energy in the boiler, in such a way that, when required, additional power can be made available in the seconds range simply by further opening the turbine valves. At the same time, the burner power is also increased, in order to allow the suddenly increased power to also be provided in the long term, by cancelling the throttling back.

However, throttling back the valves has the side effect that this always has a negative influence on the installation efficiency and the absolute power during normal operation. Because increased burner power must be possible, this also leads to over design of the boiler with its auxiliary and ancillary installations, and to a poorer cost balance.

A further possible way, which is currently used, to provide the required power reserve at short notice (often in conjunction with the throttling back of the turbine valve) is so-called condensate build-up. In this case, the bleed steam to the low-pressure preheaters is reduced (possibly down to 0 kg/s). This steam mass flow is correspondingly available for electricity generation in the steam turbine set. The increased amount of condensate which is available in the condenser as a result is first of all temporarily stored in the so-called hotwell and, once the burner power of the boiler has been correspondingly increased, the hotwell level is turned to the normal level again.

At the same time, if required, the amount of condensate fed by the condensate pump is also reduced, in order to maintain the condensate temperature despite the reduced bleed steam. In order to allow this to be ensured overall, the fired boiler and its auxiliary and ancillary installations must be designed to be correspondingly larger (that is to say additional costs). The installation is accordingly operated in the partial load range during normal operation, thus leading to corresponding efficiency losses.

SUMMARY OF INVENTION

Against the background of the problems and disadvantages of the prior art, the invention is based on the object of developing a method of the type mentioned initially such that, on the one hand, the grid system frequency is stabilized particularly effectively, and on the other hand this is done cost-effectively.

In order to achieve the object according to the invention, it is proposed that the first shaft of the power turbine and of the first generator rotates permanently synchronized to the grid system and the generator drives the power turbine as a motor, and a second shaft of the gas generator rotates permanently at an initiation rotation speed, wherein, when there is a load demand, the gas generator is initiated and the power turbine is driven by the gas produced by the gas generator, such that the generator generates electricity.

In this case, the power turbine is that turbine part of the gas turbine which can be used to produce usable technical work, in particular to generate electrical power. This is that turbine part which is not used to drive the compressor of the gas turbine.

The major advantage of the invention is that the own demand which is required to achieve the rapid starting capability—on the one hand for the two-shaft gas turbine by the starter motor, which keeps the gas generator at the initiation rotation speed, and on the other hand the operation of the generator in the motor mode in synchronism with the grid system frequency—is considerably lower than the power additionally obtained with the same use of primary energy, for example in a steam power station as a result of the absence of or reduction of any turbine valve throttling. Cost savings also result from the fact that the boiler in power stations, together with its auxiliary and ancillary installations, can be designed to be correspondingly smaller, since the additionally required heat which results, for example, from a condensate build-up, need not be supplied in the fired boiler, thus leading to cost savings and performance improvements. By way of example, this allows steam power stations to be operated more economically during normal operation.

Particular advantages are obtained by making the method operation for a method more flexible in the course of retrofitting an existing installation, thus making it possible to react quickly to changing markets. The method according to the invention allows a gas turbine to be installed as a "booster", as it were, which can cover the peak load demand at comparatively low cost without any negative influence on the reserve power. The booster function of the method according to the invention can also advantageously be used in parallel with conventional reserve mechanisms, for example of steam power stations, thus allowing the provision of a power reserve according to the invention also to be used, for example, in addition to turbine valve throttling to provide a power reserve, by means of switching.

One advantageous development of the invention provides for the gas turbine and the first generator to be associated with a steam power station which has a central control system which controls the gas turbine and the steam power station, and which control system causes initiation of the gas generator when there is a power demand on the steam power station which exceeds a specific limit. This invention is particularly advantageous because, for example, it is possible to save or replace conventionally costly reserve provision mechanisms in the steam power station.

The gas generator expediently has at least one compressor, one combustion chamber and one starter motor, which are connected to one another by means of a second shaft in a torque-transmitting manner. This configuration corresponds to that of a conventional gas generator side of a two-shaft gas turbine, and is routinely commercially available.

Furthermore, it is expedient for the steam power station to have at least one steam turbine, a boiler, a condenser and a second generator, where the exhaust gas flow from the gas turbine is passed into a waste-heat boiler, in which a circulating medium in the steam power station is preheated before entering the boiler. This not only results in the grid system frequency being supported from the power turbine, by means of the electrical power from the first generator, but also reduces the load on the firing of the boiler in the steam power station in addition, thus resulting in improved efficiency even when on the peak load.

Since the own requirement for power in a relatively large steam power station is invariably significant, the power output from the first generator can be used at least partially or completely to partially or completely cover the own demand of the steam power station itself, in order to simplify the control of the overall arrangement comprising the gas turbine according to the invention and the steam power station.

It is particularly worthwhile to use a gas switch between the gas turbine and the waste-heat boiler, which gas switch passes the exhaust-gas flow either through the waste-heat boiler or to a bypass which opens into the environment. This allows the gas generator or the gas turbine to be first of all started up very largely independently of the steam circuit of the steam power station, and allows the waste-heat boiler to subsequently be activated by means of the gas switch, to intervene in this way in the thermodynamics of the steam power station. This leads to the support when on peak load being additionally speeded up.

In the interest of increased efficiency, it is expedient if the circulating medium is heated in at least one preheater downstream from the condenser during operation without use of the gas turbine, which preheater is heated by means of bleeds from the steam turbine, wherein a bleed amount is passed from the steam turbine to the preheater by means of bleed lines.

Furthermore, it is worthwhile if the circulating medium is heated in waste-heat boiler preheaters which are heated by the exhaust-gas flow from the gas turbine, downstream from the condenser during operation with support from the gas turbine. In this context, it is worthwhile if control valves are arranged in the bleed lines, and control valves are arranged in the waste-heat boiler preheater lines, wherein the bleed amount is reduced by means of the control valves when the support from the gas turbine increases, and the waste-heat boiler preheater amount is increased by means of the control valves. In addition to reducing the load on the boiler of the steam power station, this thermodynamic intervention in the circuit of the steam power station also results in a higher power output from the steam turbine, as a result of which the method according to the invention first of all provides rapid, purely electrical, support from the power produced by means of the first generator, followed by subsequent additional thermodynamic support to the steam power station, thus on the one hand increasing the efficiency of the overall arrangement while on the other hand additionally increasing the total power.

In the interest of support which is as fast as possible and is also thermodynamic, in the manner described above, by means of the gas turbine, it is expedient if the waste-heat boiler is kept at a minimum temperature during operation without support from the gas turbine, such that the exhaust-gas flow can be passed through the waste-heat boiler, in order to preheat the circulating medium in the steam power station, by means of the gas switch, as close in time as possible to the initiation of the gas generator.

BRIEF DESCRIPTION OF THE DRAWINGS

The invention will be described in more detail in the following text using one specific exemplary embodiment and with reference to a drawing for illustrative purposes. For a person skilled in the art, these statements will result in additional possible ways to implement the invention which may differ from the specific exemplary embodiment. In the FIGURE:

FIG. 1: shows a schematic overview of the circuitry and method of operation of various installation components based on the method according to the invention.

DETAILED DESCRIPTION OF INVENTION

The FIGURE shows a schematic overview of an installation having a steam power station DKW and a gas turbine GT with a first generator GE1, which installation is operated using the method according to the invention. Like a second generator GE2, the first generator GE1 is connected to an electrical grid system NT with the alternating current being at a grid system frequency f, and the generators each rotate at a rotation speed which corresponds to the grid system frequency f.

The gas turbine GT has two shafts S1, S2, with a first shaft S1 connecting the first generator GE1 to a power turbine PT in a torque-transmitting manner, and with a second shaft S2 connecting a starter motor SM to a drive turbine DT and a compressor CO in a torque-transmitting manner. Together with a combustion chamber CB, the starter motor SM, the compressor CO and the drive turbine DT form a gas generator GG which, when required, produces hot gas GS for driving the first generator GE1. The gas generator GG is started in order to stabilize the grid system frequency f in the event of a possible sudden power demand, and drives the power turbine PT by means of the hot gas GS, such that the first generator GE1 can feed the electrical power P1 that is generated into the grid system NT. In order to allow the gas generator GG to be started as quickly as possible, the starter motor SM permanently rotates the second shaft S2 at an initiation rotation speed fI, such that the gas generator GE produces the required hot gas GS within a very short time after a central control system CU has initiated the combustion chamber CB. The gas turbine GT, which is operated using the method according to the invention, is in this exemplary embodiment attached to the steam power station DKW, and some of the power P1 produced by the gas turbine GT and the first generator GE1 is used to partially or to completely cover the own demand of the steam power station DKW and of the gas turbine GT. The excess power P1 that is produced is fed into the grid system NT. The central control system CU controls both the processes of the gas turbine GT and of the first generator GE1 as well as those of the entire steam power station DKW.

In addition to the coupling, for control and electrical purposes, between the steam power station DKW and the gas turbine GT, or the first generator GE1, which is operated using the method according to the invention, this exemplary embodiment also provides thermodynamic coupling between the gas turbine GT and the circuit of the steam power station DKW when required and to be precise during operation with gas turbine support.

The steam power station DKW has the following components, which are listed in the circulation direction of a circulating medium CF: steam turbine ST, condenser CON, condensate pump CP, first preheater PH1, second preheater PH2, feed pump FP, third preheater PH3, second boiler BO2. A second generator GE2 is coupled in a torque-transmitting manner to the steam turbine ST, and is synchronized to the grid system frequency f. Bleeds are provided from the steam turbine ST at three different points at different temperatures and different pressures, by means of bleed lines LET1, LET2, LET3, through each of which a bleed amount CF1, CF2, CF3 of the circulating medium is passed. Corresponding to their temperature and their respective bleed pressure, the bleed amounts CF1, CF2, CF3 are split between the three preheaters PH1, PH2, PH3, in such a way that the first preheater PH1 receives the bleed amount CF1 at the lowest pressure and the lowest temperature for heating, and the third preheater PH3 receives the bleed amount CF3 at the highest temperature.

During operation with thermodynamic support by the gas turbine GT, the preheaters PH1, PH2, PH3 are at least partially supported by means of waste-heat boiler preheaters PHEX1, PHEX2, to which waste-heat boiler preheater lines LPHEX1, LPHEX2 pass waste-heat boiler preheater amounts CFPHEX1, CFPHEX2 of the circulating medium CF. Respective preheater line valves VLET1, VLET2, VLET3 and waste-heat boiler preheater line valves VLPHEX1, VLPHEX2 are provided in the preheater lines LET1 to LET3 and in the waste-heat boiler preheater lines LPHEX1, LPHEX2. These valves allow the bleed amount from the steam turbine ST of the circulating medium CF to be reduced, and the waste-heat boiler preheater amount CFPHEX1 and CFPHEX2 to be increased, such that the circulating medium is preheated by an exhaust-gas flow EX in the waste-heat boiler BO2.

The exhaust gas EX from the gas generator GG, or from the power turbine PT, is first of all passed to a gas switch DD, which passes the exhaust-gas flow EX either via a bypass BY into the environment EV, or into a waste-heat boiler BO2. After cooling down the exhaust gas EX, the waste-heat boiler BO2 likewise opens into the environment EV. In the situation in which the exhaust-gas flow is not passed via the waste-heat boiler, a control valve WV, which is then closed, reduces any heat losses (standby mode).

The waste-heat boiler BO2 is kept above a minimum starting temperature during operation, thus allowing the waste-heat boiler BO2 to be quickly thermally coupled to the steam power station circuit. For this purpose, a portion of the circulating medium CF is passed through the waste-heat boiler BO2 via the waste-heat boiler preheater lines LPHEX1, LPHEX2 during operation without gas turbine support.

The invention claimed is:

1. A method for stabilization of a grid system frequency of an electrical grid system, comprising:
   providing a gas turbine comprising a power turbine on a first side of the gas turbine and a gas generator on a second side of the gas turbine;
   connecting the power turbine of the gas turbine by way of a first shaft disposed on the first side of the gas turbine to a first generator in a torque-transmitting manner, wherein the first shaft rotates permanently synchronized to the grid system frequency;
   connecting the gas generator of the gas turbine by way of a second shaft disposed on the second side of the gas turbine to a starter motor that transmits torque to the gas generator, wherein the second shaft rotates permanently at an initiation rotation speed imparted by the starter motor;
   initiating the gas generator in response to the initiation rotation speed to produce hot gas when there is a sudden power demand that, if not met, would destabilize the grid system frequency in the electrical grid system; and
   driving the power turbine by the hot gas produced by the gas generator, such that the first generator generates an amount of electricity effective to meet the sudden power demand and thus maintain stability of the grid system frequency in the electrical grid system.

2. The method as claimed in claim 1,
   wherein the gas turbine and the first generator are associated with a steam power station,
   wherein the steam power station includes a central control system which controls the gas turbine and the steam power station, and
   wherein the control system causes an initiation of the gas generator when there is a power demand on the steam power station which exceeds a specific limit.

3. The method as claimed in claim 1, wherein the gas generator includes a compressor, one combustion chamber and one starter motor, which are connected to one another by means of the second shaft in a torque-transmitting manner.

4. The method as claimed in claim 2,
   wherein the steam power station comprises a steam turbine, a first boiler, a condenser and a second generator, and
   wherein an exhaust gas flow from the gas turbine is passed into a waste-heat boiler, in which a circulating medium in the steam power station is preheated by means of the exhaust-gas flow before entering the first boiler.

5. The method as claimed in claim 2,
   wherein a power output from the first generator is used to partially or completely cover an own demand of the steam power station.

6. The method as claimed in claim 4, wherein a gas switch is arranged between the gas turbine and the waste-heat boiler and passes the exhaust-gas flow either through the waste-heat boiler or to a bypass which opens into the environment.

7. The method as claimed in claim 4,
   wherein the circulating medium is heated in a preheater downstream from the condenser during operation without support from the gas turbine,
   wherein the preheater is heated by means of bleeds from the steam turbine, and
   wherein a bleed amount is passed from the steam turbine to the preheater by means of a plurality of bleed lines.

8. The method as claimed in claim 4, wherein the circulating medium is heated in a plurality of waste-heat boiler preheaters which are heated by the exhaust-gas flow, downstream from the condenser during operation with support from the gas turbine.

9. The method as claimed in claim 7,
wherein a first plurality of control valves are arranged in the plurality of bleed lines,
wherein a second plurality of control valves are arranged in a plurality of waste-heat boiler preheater lines,
wherein the bleed amount is reduced by means of a third control valve and the plurality of control valves when the support from the gas turbine increases, and the waste-heat boiler preheater amount is increased by means of the second plurality of control valves.

10. The method as claimed in claim 4,
wherein the waste-heat boiler is kept at a minimum temperature during operation without support from the gas turbine.

11. An arrangement for stabilization of a grid system frequency of an electrical grid system, comprising:
a gas turbine comprising a power turbine on a first side of the gas turbine and a gas generator on a second side of the gas turbine,
wherein a first shaft disposed on the first side of the gas turbine is arranged to connect in a torque-transmitting manner the power turbine to the first generator, wherein the first shaft rotates permanently synchronized to the grid system frequency,
wherein a second shaft disposed on the second side of the gas turbine is arranged to interconnect to one another the gas generator and a starter motor, wherein the second shaft rotates permanently at an initiation rotation speed imparted by the starter motor, and
wherein, when there is a sudden power demand, that, if not met, would destabilize the grid system frequency in the electrical grid system, the gas generator is initiated in response to the initiation rotation speed to produce hot gas, and the power turbine is driven by the hot gas produced by the gas generator, such that the first generator generates an amount of electricity effective to meet the sudden power demand and thus maintain stability of the grid system frequency in the electrical grid system.

12. The arrangement as claimed in claim 11,
wherein the gas turbine and the first generator are associated with a steam power station,
wherein the steam power station includes a central control system which controls the gas turbine and the steam power station, and
wherein the control system causes an initiation of the gas generator when there is a power demand on the steam power station which exceeds a specific limit.

13. The arrangement as claimed in claim 11, wherein the gas generator includes a compressor, one combustion chamber and one starter motor, which are connected to one another by means of the second shaft in a torque-transmitting manner.

14. The arrangement as claimed in claim 12,
wherein the steam power station comprises a steam turbine, a first boiler, a condenser and a second generator, and
wherein an exhaust gas flow from the gas turbine is passed into a waste-heat boiler, in which a circulating medium in the steam power station is preheated by means of the exhaust-gas flow before entering the first boiler.

15. The arrangement as claimed in claim 12,
wherein a power output from the first generator is used to partially or completely cover an own demand of the steam power station.

16. The arrangement as claimed in claim 14, wherein a gas switch is arranged between the gas turbine and the waste-heat boiler and passes the exhaust-gas flow either through the waste-heat boiler or to a bypass which opens into the environment.

17. The arrangement as claimed in claim 14,
wherein the circulating medium is heated in a preheater downstream from the condenser during operation without support from the gas turbine,
wherein the preheater is heated by means of bleeds from the steam turbine, and
wherein a bleed amount is passed from the steam turbine to the preheater by means of a plurality of bleed lines.

18. The arrangement as claimed in claim 14, wherein the circulating medium is heated in a plurality of waste-heat boiler preheaters which are heated by the exhaust-gas flow, downstream from the condenser during operation with support from the gas turbine.

19. The arrangement as claimed in claim 17,
wherein a first plurality of control valves are arranged in the plurality of bleed lines,
wherein a second plurality of control valves are arranged in a plurality of waste-heat boiler preheater lines,
wherein the bleed amount is reduced by means of a third control valve and the plurality of control valves when the support from the gas turbine increases, and the waste-heat boiler preheater amount is increased by means of the second plurality of control valves.

20. The arrangement as claimed in claim 14,
wherein the waste-heat boiler is kept at a minimum temperature during operation without support from the gas turbine.

* * * * *